(12) United States Patent
Persson

(10) Patent No.: US 6,443,508 B1
(45) Date of Patent: Sep. 3, 2002

(54) DEVICE FOR INTERLOCKING TWO PARTS

(75) Inventor: Hans Persson, Bollnäs (SE)

(73) Assignee: Nefab AB, Alfta (SE)

( * ) Notice: Subject to any disclaimer, the term of this patent is extended or adjusted under 35 U.S.C. 154(b) by 0 days.

(21) Appl. No.: 09/601,047

(22) PCT Filed: Jan. 27, 1999

(86) PCT No.: PCT/SE99/00108
§ 371 (c)(1),
(2), (4) Date: Jul. 26, 2000

(87) PCT Pub. No.: WO99/38778
PCT Pub. Date: Aug. 5, 1999

(30) Foreign Application Priority Data

Jan. 28, 1998 (SE) .............................................. 9800252

(51) Int. Cl.⁷ .............................................. E05C 19/00
(52) U.S. Cl. ................... 292/300; 292/288; 292/302; 292/1; 292/DIG. 11; 292/237; 292/787; 292/315; 292/375
(58) Field of Search ................ 292/288–300, 292/302, DIG. 11, DIG. 10; 220/233, 237, 787, 315, 375

(56) References Cited

U.S. PATENT DOCUMENTS

| | | | | |
|---|---|---|---|---|
| 1,214,799 A | * | 2/1917 | Lewis | 292/288 |
| 1,719,343 A | * | 7/1929 | Strayer | 292/87 |
| 2,793,064 A | * | 5/1957 | Budoff | 292/288 |
| 3,930,678 A | * | 1/1976 | Alexander | 292/284 |
| 4,102,545 A | * | 7/1978 | Jay | 292/57 |
| 4,327,842 A | * | 5/1982 | Walter | 220/375 X |
| 4,453,471 A | | 6/1984 | Harrington et al. | |
| 4,640,575 A | * | 2/1987 | Dumas | 292/1 X |
| 4,915,430 A | * | 4/1990 | Vitale | 292/145 |
| 5,114,194 A | * | 5/1992 | Toifl et al. | 292/106 |
| 5,222,619 A | * | 6/1993 | Gregory | 220/324 |
| 5,513,768 A | * | 5/1996 | Smith | 220/375 X |
| 5,588,853 A | * | 12/1996 | Anthony | 220/375 X |
| 6,112,934 A | * | 9/2000 | Jung et al. | 220/315 |

FOREIGN PATENT DOCUMENTS

| | | |
|---|---|---|
| DE | 4340380 | 6/1995 |
| EP | 0455875 | 11/1991 |
| WO | 91/15404 | 10/1991 |

* cited by examiner

*Primary Examiner*—Beth A. Stephan
*Assistant Examiner*—Brian E. Glessner
(74) *Attorney, Agent, or Firm*—Dilworth & Barrese LLP.

(57) ABSTRACT

A device for interlocking two disc-like parts (2, 3) comprises a locking element (4), which presents first locking means (5) for fixing the locking element to a first one (3) of the parts, and second locking means (6) for fixing the second one (3) of the parts in relation to the locking element, and thereby in relation to the first part (2) as the latter and the locking element are interconnected. The first locking means (5) of the locking element and the first part (2) comprise a first set of first and second locking members (6', 7) engaging each other. These first and second locking members are designed as a projection (6') and a recess (7), respectively. These are mobile into engagement with each other in a direction (R1) which forms an angle that is preferably generally perpendicular in relation to the plane (3) of the first part (2).

19 Claims, 2 Drawing Sheets

DEVICE FOR INTERLOCKING TWO PARTS

THE FIELD OF INVENTION AND PRIOR ART

This invention relates to a device for interlocking two disc-like parts according to the preamble of the annexed claim 1. Said disc-like parts are, preferably, comprised by a packing, such as a box, a container, a loading pallet-like device, etc. The disc-like parts may, for example, have the character of walls, bottom and/or lid for the box in question.

The use of separate locking elements is known. For example, it can be referred to the Swedish Patent 8306155-6. In this patent, locking elements which are lockable in relation to a holder element thanks to the locking element presenting a turned end are disclosed, said end forming an anchorage in relation to the holder element. The second end of the locking element is to be bent for a locking in relation to the other locking means, for example after having been put through a slit in the latter.

There are lots of disadvantages of this prior art. For example, it is quite difficult to bring the locking element into an adequate engagement, such that the parts are interconnected. When the locking engagement is to be released, the locking element has to be bent in order to bring it out of its locking engagement. Furthermore, the known solution requires that particular holder elements are produced and fixed to the first part. Such holder elements complicate the execution both as a consequence of the cost of the holder elements themselves and the very application of the holder elements onto the first part.

SUMMARY OF THE INVENTION

The object of the present invention is to further develop prior art, such that the device can be simplified in at least some aspects, but, in spite of that, be put in a locking condition and released respectively without any particular difficulty.

According to the invention, this objective is achieved by providing the device with the features referred to in the annexed patent claims, and particularly the features defined in claim 1.

By means of the solution defined in claim 1, the objective is achieved as the first and second locking members of the first set are designed as a projection and a recess respectively, and as the projection and the recess are mobile into engagement with each other in a direction which forms an angle that is larger than 0° and less than 180°, preferably a generally perpendicular angle, between itself and the plane of the first disc-like part. In other words, only one recess is thus required on the first part in order to realize the locking effect aimed at. Thereby, prerequisites of accomplishing the recess through a puce caving operation in the first part are created. This caving operation may, for example, be performed actively by means of stamping, drilling, cutting, or other similar mechanical treatment operations, which might, for example, be the case for disc-like parts made of plywood, plastic, sheet, etc. But the recess may also be realized in a way which is, so to say, less "active", for example by providing the dye with a recess-forming dye element during dye-casting of the first part, meaning that a hole which constitutes said recess has been obtained in the dye piece subsequently to the removal of the dye piece forming the first part from the casting dye.

However, it should be stated that it is within the scope of the invention to design the recess in other ways, for example by letting a mounting or an additional piece attached to the first part present material portions that delimit the recess. It is also within the scope of the invention that the recess may go straight through the first part or have the character of a bottom hole, that is not passing all the way through the first part.

According to a particularly preferred embodiment of the invention, the second locking means of the locking element and the second part comprise a second set of locking members comprising a hook and a socket, into which the hook is insertable, it being presumed, according to a further development, that the second locking means is insertable to engagement with the socket arranged on the second part in a direction which extends with an angle, preferably a generally perpendicular angle, in relation to the direction, in which the projection and the recess are mobile into engagement with each other. Thanks to the latter condition, the second locking means will be effectively locked in relation to the socket by bringing the projection and the recess into a locking engagement with each other.

Further advantageous embodiments of the invention and advantages related hereto will be evident from the following description.

BRIEF DESCRIPTION OF THE DRAWINGS

With reference to the annexed drawings, a more detailed description of an embodiment of the invention referred to by way of example, will follow below.

In the drawings

DETAILED DESCRIPTION OF A PREFERRED EMBODIMENT

Figure 1:
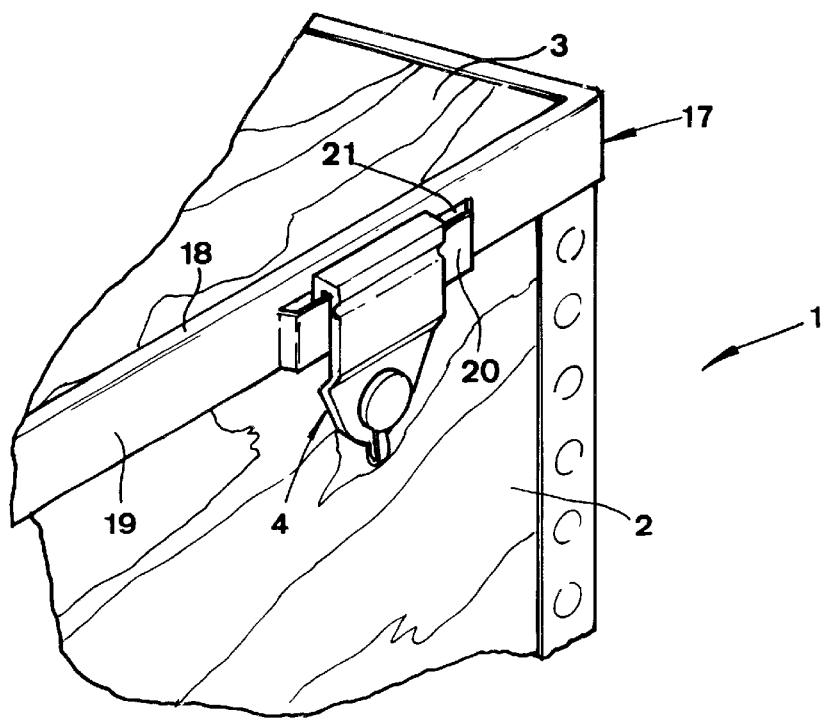
FIG. 1 is a perspective view of a part of a box provided with the inventive device.
Figures 2, 3:
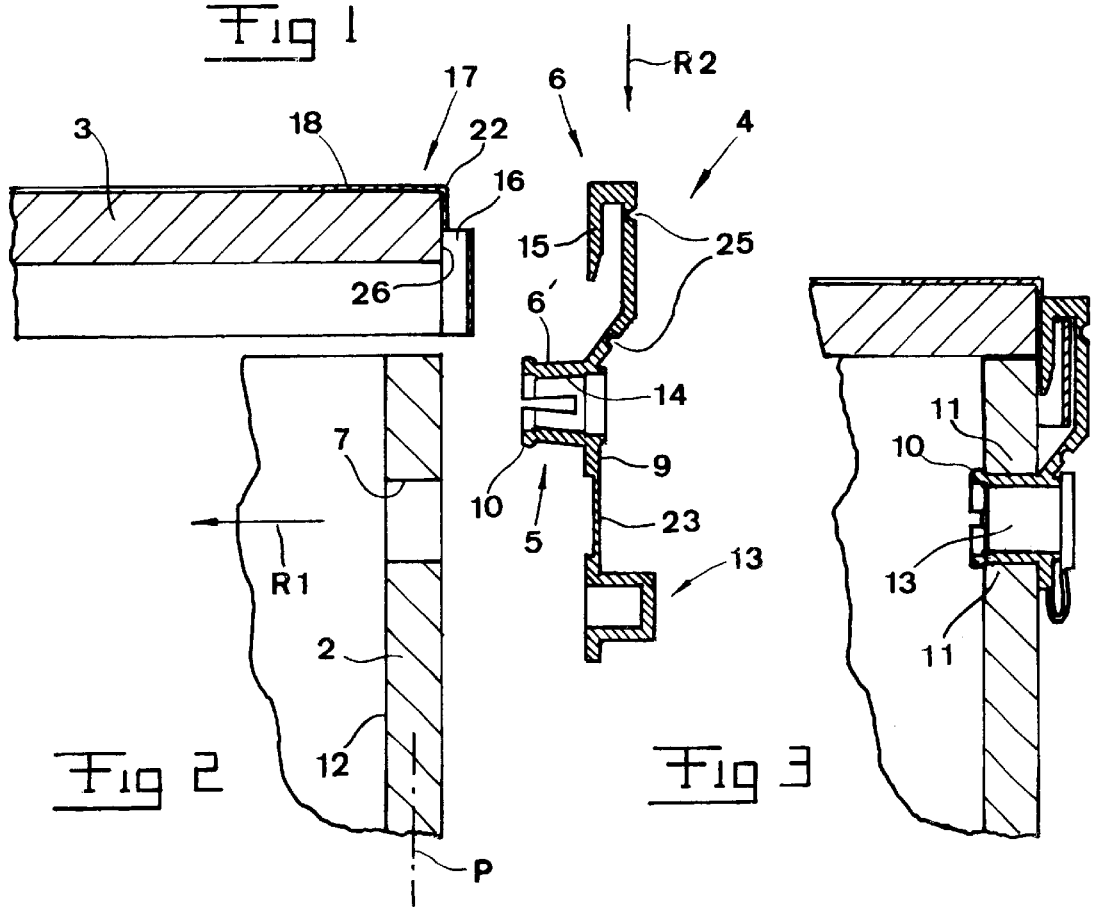
FIG. 2 is an exploded view, partly in cross-section, illustrating the locking device of the box according to FIG. 1, but from a sideview.
FIG. 3 is a view showing the same components as FIG. 2, but illustrating the locking device in a locked position.
Figure 4:
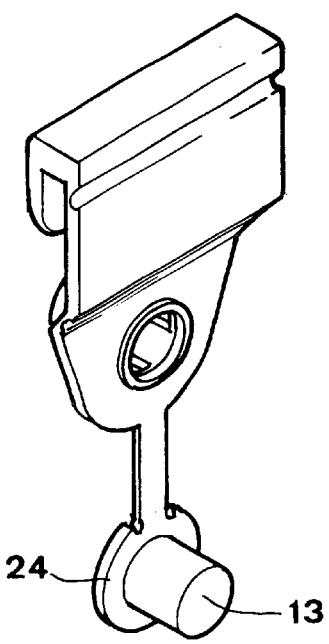
FIGS. 4 and 5 are perspective views from opposite directions of the inventive locking element, as seen in a condition, in which the stop element is in an inactive condition.

In FIGS. 1–3 a box, generally indicated with 1, is illustrated. The box comprises two parts 2 and 3, respectively. These parts have the character of discs. Here, it is suggested that one 2 of the parts is comprised by a wall, while the other part 3 is comprised by a lid. However, this is not critical for the idea of the invention; the two parts could, on the other hand, be comprised by wall/bottom, wall/wall, or any other arbitrary combination of two disc-like parts of boxes, packings, or the like, or other constructions.

The inventive locking device comprises a locking element, generally indicated with 4. This locking element presents first locking means 5 for fixing the locking element 4 to the part 2, and second locking means 6 for fixing the locking element in relation to the second part 3, the two parts 2, 3 being possible to lock in relation to each other via the locking element 4.

The first locking means 5 of the locking element 4 and the part 2 comprise a first set of first and second locking members, 6', 7 engaging each other. These first and second locking members are designed as a projection 6' and a recess 7 respectively, and they are mobile into engagement with each other in a direction R1 which defines an angle which is larger than 0° and less than 180°, preferably a generally perpendicular angle, in relation to the plane P of the disc-part 2. What has been stated thus implies that the recess 7 of the example will extend with its geometric axis generally perpendicularly to the plane P of the part 2.

Although it would be possible, according to the invention, that portions delimiting the recess 7 would be made of an elastically deformable material, the projection 6' itself is, in this example, supposed to be accomplished by means of such an elastically deformable material, at least partly.

The projection 6' is designed such that an engagement between the projection and the recess is obtained when they are brought together.

Figure 5:
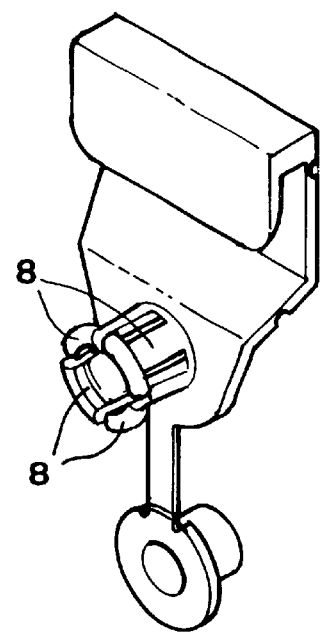
Figure 7:
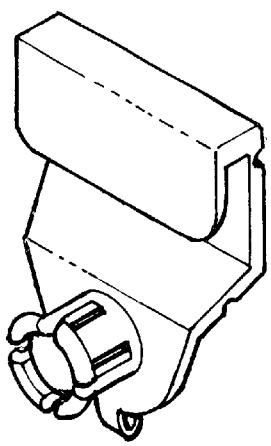

Thereby, it is preferred that the projection 6' presents elastically deformable members which are to be received in the recess 7. As might be seen most clearly in FIGS. 5 and 7, these elastically deformable members 8 are four as to their number in this example. However, it is also within the scope of the invention that the number of elastically deformable members is anything from one and more.

At ends projecting from a base 9 of the locking element 4, the elastically deformable members 8 present gripping parts 10 for gripping behind the portions 11 of the part 2 that delimit the recess 7, in a way illustrated in FIG. 3

The elastically deformable members 8 may be described as having the character of resilient arms which project from the base 9 of the locking element 4. In the example illustrated on the drawing, the projection 6' is supposed to penetrate through the recess 7, implying that the length of the projection 6' must be at least equal to the thickness of the part 2. However, this is not a requirement, and the recess 7 in the part 2 could, on the other hand, have the character of a bottom hole. Furthermore, the recess 7 could be designed at the inside in such a way that it would obtain a shoulder, around which the gripping parts 10 could grip in order to enable these gripping parts 10 to establish an engagement with such a shoulder without needing to reach behind the inside of the part 2, indicated with 12 in FIG. 2.

Figure 6:
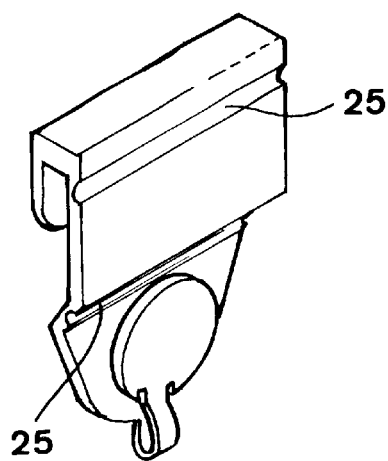
FIGS. 6 and 7 are views similar to FIGS. 4 and 5, but illustrating the stop means inserted into a cavity in the recess.

The inventive device comprises a stop means 13 for stopping the projection 6' from being deformed such that the form-locking engagement between the projection and the recess 7 ceases. More precisely, the stop means 13 is insertable into a cavity 14 in the recess 6' in a way indicated by FIGS. 3 and 6–7. In this example, the stop means has the character of a tap which, when being inserted into the cavity 14, prevents the elastically deformable members from resiliently pushing inwards, such that the engagement with the portions surrounding the recess ceases.

The second locking means 6 of the locking element and the second part 3 comprise a second set of locking members comprising a hook 16 and a socket 16, into which the hook is insertable.

In the example, the socket 16 has the character of a slit, and it is formed by means of a mounting 17 fastened to the part 3. This mounting 17 more precisely has the character of a band which, suitably, is angular in such a way that it bears on one of the flat sides of the part 3 with a first flange 18, while a second flange 19 of the mounting 17 bears on the externally directed edge surface of the part 3. At the flange 19 there are portions 20 which are bent outwards and which form the socket 16 for receiving the hook 15 in a way which is indicated in FIG. 3. The bending of the portion 20 outwards enables the hook 15 to find enough space in the socket 16, not withstanding the condition that the flange 19 of the mounting 17 at the side of the externally bent portion 20 suitably bears on the edge surface 26 of the part 3.

The socket 16 is open for the reception of the hook 15 through a slot in the flange 19, indicated with 21. In the example, the slot 21 is suggested to be located at a distance from the intersection 22 between the flanges 18 and 19, but the slot 21 could, of course, be located in the region of said intersection 22, such that the portion 20, accordingly, corresponds generally to the whole width of the flange 19. Such variations within the frame of the inventive theme is within the area of knowledge of the average man skilled in the art.

The locking means 6, more precisely the hook 15, is insertable to engagement with the socket 16 in a direction R2 which extends in an angle, preferably a generally perpendicular-angle, in relation to the direction R1, in which the projection; 6' and the recess 7 are mobile into engagement with each other.

Although the inventive locking element could be made of arbitrary materials, such as metals, it is preferred that it is designed as one piece made of a polymer.

It is preferred that the stop means 13 and the locking element 4 are also interconnected by means of a flexible connection member 23. In the case, where the locking element 4 is produced as one piece of a polymer, also the production of the stop means 13, and the connection member 23 is accomplished simultaneously with the production of the locking element.

The connection member 23 should, of course, have such a length that it permits the stop means 13 to be brought into the cavity of the projection 6', as is indicated in FIG. 3.

It is preferred that the stop means 13, which has the shape of a tap, presents a projecting flange 24, the objective of which is to facilitate the removal of the stop means 13 from its position in the cavity 14 of the projector 6, for example by means of a screw-driver or a similar tool.

It is preferred that the locking element 4 presents at least one, and in the example two, weakened bending zones 25 in the region between the very hook 15 and the projection 6'. The objective of these bending zones is to absorb the possible bends that are required as the hook 15 is brought into engagement with the socket 16 and the subsequent displacement of the projection 6' into the recess 7. As a matter of form, it is noted that it is within the scope of the invention not to arrange one or more specific bending zones 25 obtained through a weakening of the material in the locking element 4, but that the device could be such that the whole portion which connects the hook 15 and the projection 6' could be arranged to be able to be subjected to such a bending, if that is required under the circumstances in order to bring the locking element into a locking engagement with the parts 2, 3 and release the locking element, respectively.

During the use of the inventive locking element, the hook 15 is first moved into the socket 16', and then the projection 6' is moved into the recess 7, followed by the stop means 13 being moved into position inside the projection 6', accomplishing the situation according to FIG. 3, where the locking element effectively interlocks the parts 2, 3, and where any unintentional release of the engagement between the projection 6' and the recess 7 does not need to be expected. During a release of the locking element, the stop means 13 is removed out of the projection 6', and then the latter is pulled out of the recess 7, whereafter the hook 15 can be moved out of the socket 16.

The inventive locking element is extremely easy for the users to manipulate. Especially by the embodiment of the locking element made of a plastic material, prerequisites are accomplished for a locking element, all the parts of which adhere to each other, and also the risk of having accidents is substantially reduced in comparison to a case where the locking element would be produced out of metal. An embodiment of plastic also implies less noise during manipulation, and lower freight weights. However, it should be noted that it is within the scope of the invention to make the locking element of metal in the case of particularly demanding applications.

Of course, the invention is not delimited only to the disclosed embodiment. Accordingly, a lot of modifications of the embodiments can be made by the average man skilled in the art as soon as the inventive idea has been disclosed. A few of these modifications have already been discussed above. This discussion should, however, not be seen as complete. The scope of the invention appears from the following patent claims, including equivalent embodiments.

What is claimed is:

1. A device for interlocking two disk-like parts (2,3) comprising:
    a first disk-like part (2),
    a second disk-like part (3),
    a locking element (4) having first locking means (5) for fixing the locking element (4) to the first (2) disk-like part, and second locking means (6) for fixing to the second (3) disk-like part, such that said first (2) and second (3) disk-like parts (2,3) are interlocked by said locking element (4),
    said first locking means (5) of said locking element (4) and said first disk-like part (2) comprising a set of first (6') and second (7) locking members structured and arranged to engage each other and formed as a projection (6') and recess (7) respectively,
    said projection (6') and recess (7) being movable into engagement with one another in a direction (R1) forming an angle larger than 0° and less than 180° in relation to a plane (P) of said first-disk part (2),
    at least one of said projection (6') and recess (7) being constituted by elastically deformable material, at least one of said projection (6') and recess (7) having a design permitting form-locking engagement when brought together, and
    means (13) for stopping at least one of said projection (6') and recess (7) from being deformed to release the form-locking engagement.

2. A device according to claim 1, wherein said angle is a generally perpendicular angle.

3. A device according to claim 1, wherein said stop means (13) are spaced from said second locking means (6).

4. A device according to claim 1, wherein said stop means (13) are structured and arranged to be insertable into at least one of a cavity (14) defined in said projection (6') and said recess (7) itself.

5. A device according to claim 1, wherein said projection (6') comprises elastically deformable members (8) which are structured and arranged to be received in said recess (7) upon interlocking.

6. A device according to claim 4, wherein said projection (6') comprises elastically deformable members (8) which are structured and arranged to be received in said recess (7) upon interlocking.

7. A device according to claim 5, wherein, at ends projecting from a base of said locking element (4), said elastically deformable members (8) have gripping parts (10) structured and arranged for gripping behind portions (11) of said first disk-like part (2) which delimit said recess (7) therethrough on a side of said first disk-like part (2) opposite an insertion side of said first locking means (5).

8. A device according to claim 6, wherein, at ends projecting from a base of said locking element (4), said elastically deformable members (8) have gripping parts (10) structured and arranged for gripping behind portions (11) of said first disk-like part (2) which delimit said recess (7) therethrough on a side of said first disk-like part (2) opposite an insertion side of said first locking means (5).

9. A device according to claim 4, wherein said projection (6') comprises elastically deformable members (8) which are structured and arranged to be received in said recess (7) upon interlocking and define said cavity (14) into which said stop means (13) is structured and arranged to be inserted for stopping said elastically deformable members (8) from moving, upon interlocking, such that the form-locking engagement is released.

10. A device in accordance with claim 7, wherein said elastically deformable members (8) define a cavity (14) in said projection (6') and into which said stop means (13) is structured and arranged to be inserted for stopping said elastically deformable members (8) from moving, upon interlocking, such that engagement between said projection (6') and recess (7) is released.

11. A device according to claim 9, wherein said elastically deformable members (8) comprise gripping parts (10) projecting from a base of said locking element (4) and structured and arranged for gripping behind portions (11) of said first disk-like part (2) which delimit said recess (7) therethrough on a side of said first disk-like part (2) opposite an insertion side of said first locking means (5),
    with said stop means (13) structured and arranged to prevent said elastically deformable members (8) from moving such that engagement of said gripping parts (10) with said portions (11) of first disk-like part (2) delimiting said recess (7) is released.

12. A device according to claim 10, wherein said stop means (13) is structured and arranged for stopping said elastically deformable members (8) from moving upon interlocking such that engagement of said gripping parts (10) with said portions (11) of said first disk-like part (2) delimiting said recess (7) is released.

13. A device according to claim 1, wherein said second locking means (6) of said locking element (4) and said second disk-like part (3) comprise a second set of locking members (15, 16) having a hook (15) and a socket (16) into which said hook (15) is structured and arranged to be inserted.

14. A device according to claim 13, additionally comprising a mounting (17) upon which said socket (16) is formed and structured and arranged to be fastened to said second disk-like part (3), With said hook (15) being arranged upon said locking element (4).

15. A device according to claim 13, wherein said second locking means (6) is structured and arranged to be inserted into engagement with said socket (16) arranged upon such second disk-like part (3), in a direction (R2) that extends at an angle to the direction (R1) in which said projection (6') and recess (7) of said first locking means (5) are movable into engagement with each other.

16. A device according to claim 15, wherein said angle is a substantially perpendicular angle.

17. A device according to claim 1, wherein said locking element (4) is formed as a single, integral piece of polymer.

18. A device according to claim 1, additionally comprising a flexible connection member (23) interconnecting said locking element (4) and stop means (13).

19. A device according to claim 17, additionally comprising a flexible connection member (23) interconnecting said locking element (4) and stop means (13).

* * * * *